US010585434B2

(12) United States Patent
Chen et al.

(10) Patent No.: US 10,585,434 B2
(45) Date of Patent: Mar. 10, 2020

(54) RELAXABLE TURN BOUNDARIES FOR AUTONOMOUS VEHICLES

(71) Applicant: GM GLOBAL TECHNOLOGY OPERATIONS LLC, Detroit, MI (US)

(72) Inventors: Daniel Chen, San Francisco, CA (US); Yu-Cheng Lin, San Francisco, CA (US); Jeremy Allan, San Francisco, CA (US); Sohrab Haghighat, Emeryville, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 205 days.

(21) Appl. No.: 15/866,505

(22) Filed: Jan. 10, 2018

(65) Prior Publication Data

US 2018/0129209 A1 May 10, 2018

(51) Int. Cl.
| | |
|---|---|
| *G05D 1/00* | (2006.01) |
| *B60W 30/12* | (2020.01) |
| *G05D 1/02* | (2020.01) |
| *B62D 15/02* | (2006.01) |
| *B60W 50/00* | (2006.01) |
| *G06K 9/00* | (2006.01) |

(52) U.S. Cl.
CPC ........... *G05D 1/0088* (2013.01); *B60W 30/12* (2013.01); *B60W 50/0097* (2013.01); *B62D 15/025* (2013.01); *G05D 1/0212* (2013.01); *B60W 2550/143* (2013.01); *B60W 2550/146* (2013.01); *B60W 2550/402* (2013.01); *B60W 2720/24* (2013.01); *G05D 2201/0213* (2013.01); *G06K 9/00798* (2013.01)

(58) Field of Classification Search
CPC ... G05D 1/0088; G05D 1/0212; B60W 30/12; B60W 2550/143; B60W 2550/146
USPC .......................................................... 701/23
See application file for complete search history.

(56) References Cited

U.S. PATENT DOCUMENTS

| | | | | |
|---|---|---|---|---|
| 10,019,011 B1* | 7/2018 | Green | ............... | B60W 30/0956 |
| 2016/0368505 A1* | 12/2016 | Sorstedt | ............... | B60W 30/12 |
| 2017/0199523 A1* | 7/2017 | Barton-Sweeney | ............... | B60W 30/00 |
| 2017/0236422 A1* | 8/2017 | Naka | ...................... | B60W 30/09 701/301 |
| 2017/0356747 A1* | 12/2017 | Iagnemma | ............ | G05D 1/0088 |
| 2018/0051996 A1* | 2/2018 | Katsuki | ............... | G01C 21/3415 |
| 2018/0189578 A1* | 7/2018 | Yang | ................... | G01C 21/3635 |
| 2018/0203453 A1* | 7/2018 | Hardy | ................... | G05D 1/0214 |
| 2018/0237007 A1* | 8/2018 | Adam | .................... | B60W 30/12 |
| 2018/0252539 A1* | 9/2018 | Yunoki | ............... | G01C 21/3415 |
| 2018/0364723 A1* | 12/2018 | Cullinane | ............ | G05D 1/0214 |
| 2019/0009782 A1* | 1/2019 | Kanzawa | ......... | B60W 30/18154 |
| 2019/0025843 A1* | 1/2019 | Wilkinson | ............ | G05D 1/0212 |

(Continued)

*Primary Examiner* — Yazan A Soofi
(74) *Attorney, Agent, or Firm* — Lorenz & Kopf, LLP (57) ABSTRACT

Systems and method are provided for controlling a vehicle. In one embodiment, a method includes: receiving, by a processor, a lane plan; determining, by a processor, from the lane plan an upcoming turn; determining, by a processor, if the upcoming turn is at least one of an unprotected left turn, an inside right turn, and an inside left turn; when at least one of an unprotected left turn, an inside right turn, and an inside left turn is determined, modifying, by a processor, a lane boundary; and controlling the vehicle based on the modified lane boundary.

18 Claims, 6 Drawing Sheets

(56) References Cited

U.S. PATENT DOCUMENTS

2019/0243372 A1* 8/2019 Huval ............... B60W 30/0953

* cited by examiner

RELAXABLE TURN BOUNDARIES FOR AUTONOMOUS VEHICLES

INTRODUCTION

The present disclosure generally relates to autonomous vehicles, and more particularly relates to systems and methods for defining boundaries for an autonomous vehicle to drive within.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

While autonomous vehicles and semi-autonomous vehicles offer many potential advantages over traditional vehicles, in certain circumstances it may be desirable for improved operation of the vehicles. For example, autonomous vehicles rely on lane boundaries defined by maps to navigate. In some instances, the route of the vehicle requires that the vehicle cross over a defined lane boundary. In such instances, it is desirable to redefine the lane boundary to a "relaxable boundary" such that the vehicle can cross over the boundary.

Accordingly, it is desirable to provide systems and methods for defining relaxable lane boundaries. It is further desirable to provide systems and methods controlling the autonomous vehicle based on the relaxable lane boundaries. Furthermore, other desirable features and characteristics of the present disclosure will become apparent from the subsequent detailed description and the appended claims, taken in conjunction with the accompanying drawings and the foregoing technical field and background.

SUMMARY

Systems and method are provided for controlling a vehicle. In one embodiment, a method includes: receiving, by a processor, a lane plan; determining, by a processor, from the lane plan an upcoming turn; determining, by a processor, if the upcoming turn is at least one of an unprotected left turn, an inside right turn, and an inside left turn; when at least one of an unprotected left turn, an inside right turn, and an inside left turn is determined, modifying, by a processor, a lane boundary; and controlling the vehicle based on the modified lane boundary.

In one embodiment, a system includes: a first non-transitory module that, by a processor, receives a lane plan and determines from the lane plan an upcoming turn; a second non-transitory module that, by a processor, determines if the upcoming turn is at least one of an unprotected left turn, an inside right turn, and an inside left turn; a third non-transitory module that, by a processor, when at least one of an unprotected left turn, an inside right turn, and an inside left turn is determined, modifies a lane boundary; and a fourth non-transitory module that, by a processor, controls the vehicle based on the modified lane boundary.

In one embodiment, an autonomous vehicle is provided. The autonomous vehicle includes a datastore that stores a lane plan. The autonomous vehicle further includes a processor configured to determine from the lane plan an upcoming turn, determine if the upcoming turn is at least one of an unprotected left turn, an inside right turn, and an inside left turn, modify a lane boundary when at least one of an unprotected left turn, an inside right turn, and an inside left turn is determined, and control the vehicle based on the modified lane boundary.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
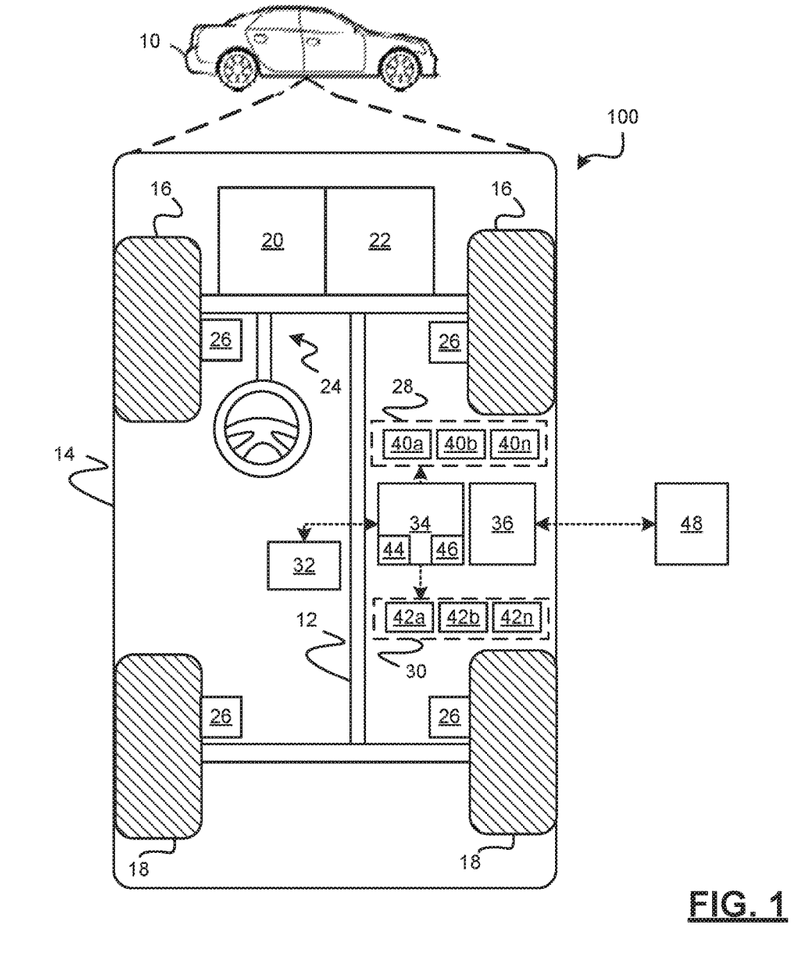
FIG. 1 is a functional block diagram illustrating an autonomous vehicle having a boundary determination system, in accordance with various embodiments.

With reference to FIG. 1, a boundary determination system shown generally at 100 is associated with an exemplary vehicle 10 in accordance with various embodiments. In general, the boundary determination system 100 draws boundary lines for the vehicle 10 to travel in. In various embodiments, the boundary lines substantially correspond to the lane boundaries of the road and define the space in which a path may be planned for the vehicle 10 to travel in. In some instances, the boundary determination system 100 determines portions of the lane boundaries to be "relaxable." A relaxable boundary is a boundary (a line or a series of points) that the vehicle 10 is able to cross over, for example, to perform a turning maneuver. As will be discussed in more detail below, the boundary determination system 100 determines the relaxable boundary based on a type of the lane, such as, a left lane, a right lane, or a shared lane. A path of the vehicle 10 is determined and the vehicle 10 is controlled based on the relaxable boundary.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the exemplary vehicle 10 is an autonomous vehicle and the boundary determination system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
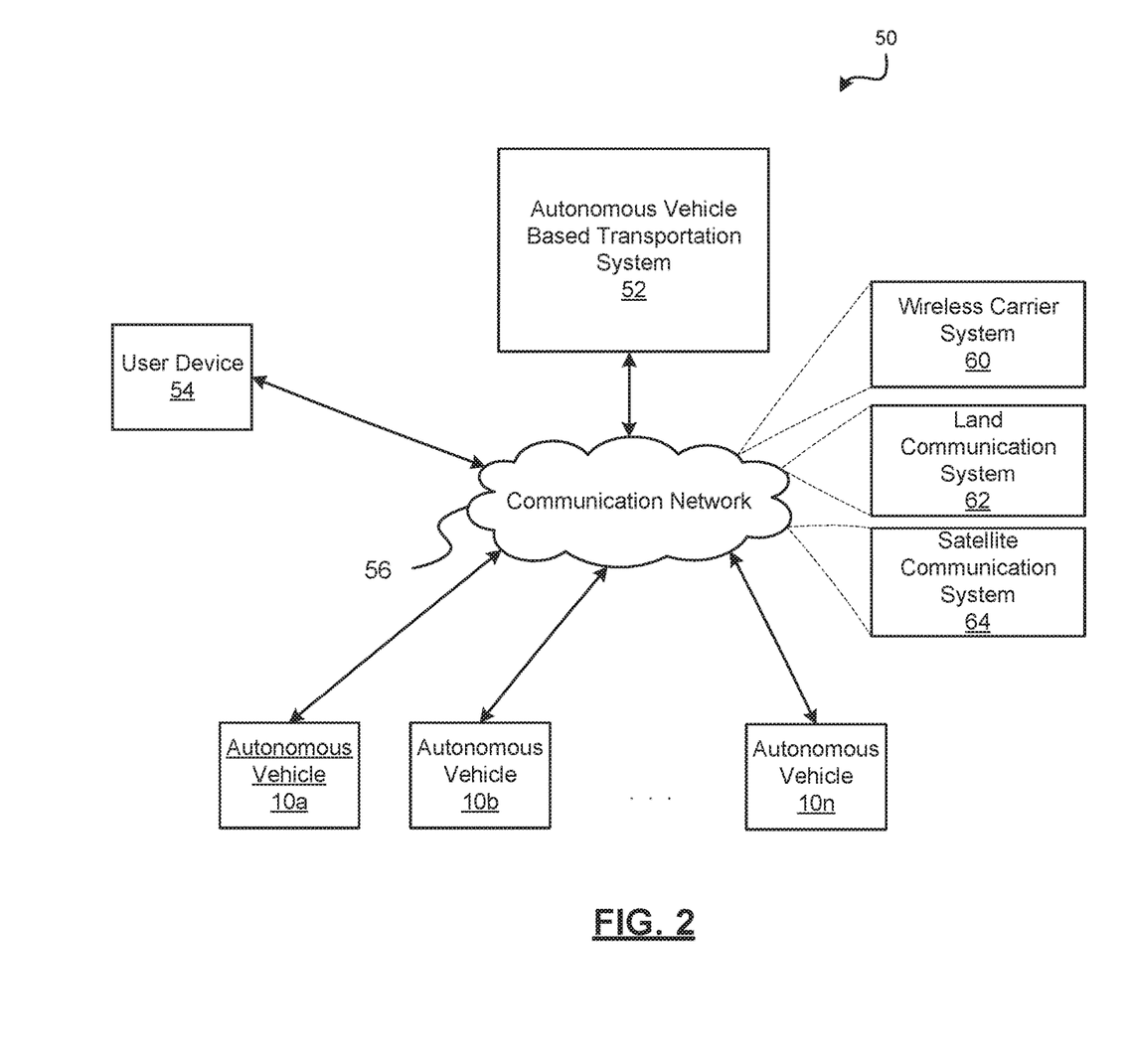
FIG. 2 is a functional block diagram illustrating a transportation system having one or more autonomous vehicles of FIG. 1, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the boundary determination system 100 and, when executed by the processor 44, determine lane boundaries as discussed in more detail below.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
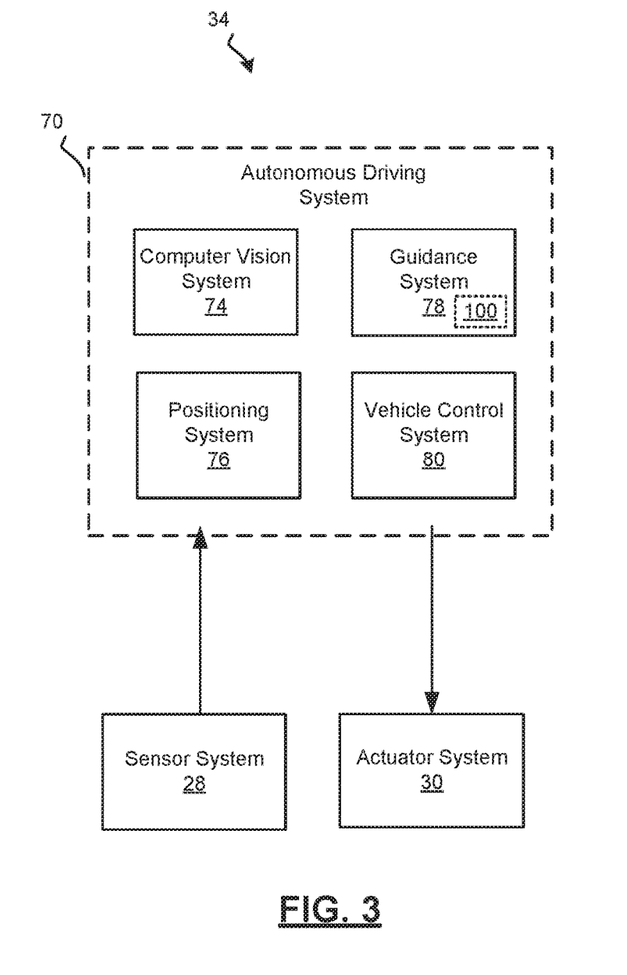
FIGS. 3 and 4 are dataflow diagrams illustrating an autonomous driving system that includes the boundary determination system of the autonomous vehicle, in accordance with various embodiments.

In accordance with various embodiments, the controller 34 implements an autonomous driving system (ADS) 70 as shown in FIG. 3. That is, suitable software and/or hardware components of the controller 34 (e.g., the processor 44 and the computer-readable storage device 46) are utilized to provide an autonomous driving system 70 that is used in conjunction with vehicle 10.

In various embodiments, the instructions of the autonomous driving system 70 may be organized by function, module, or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the boundary determination system 100 of FIG. 1 is included within the ADS 70, for example, as a part of the guidance system 78. For example, as shown in more detail with regard to FIG. 4 and with continued reference to FIG. 3, the boundary determination system 100 includes a turn determination module 102, an unprotected left turn determination module 104, an inside turn determination module 106, and a lane boundary determination module 108.

Figure 4:
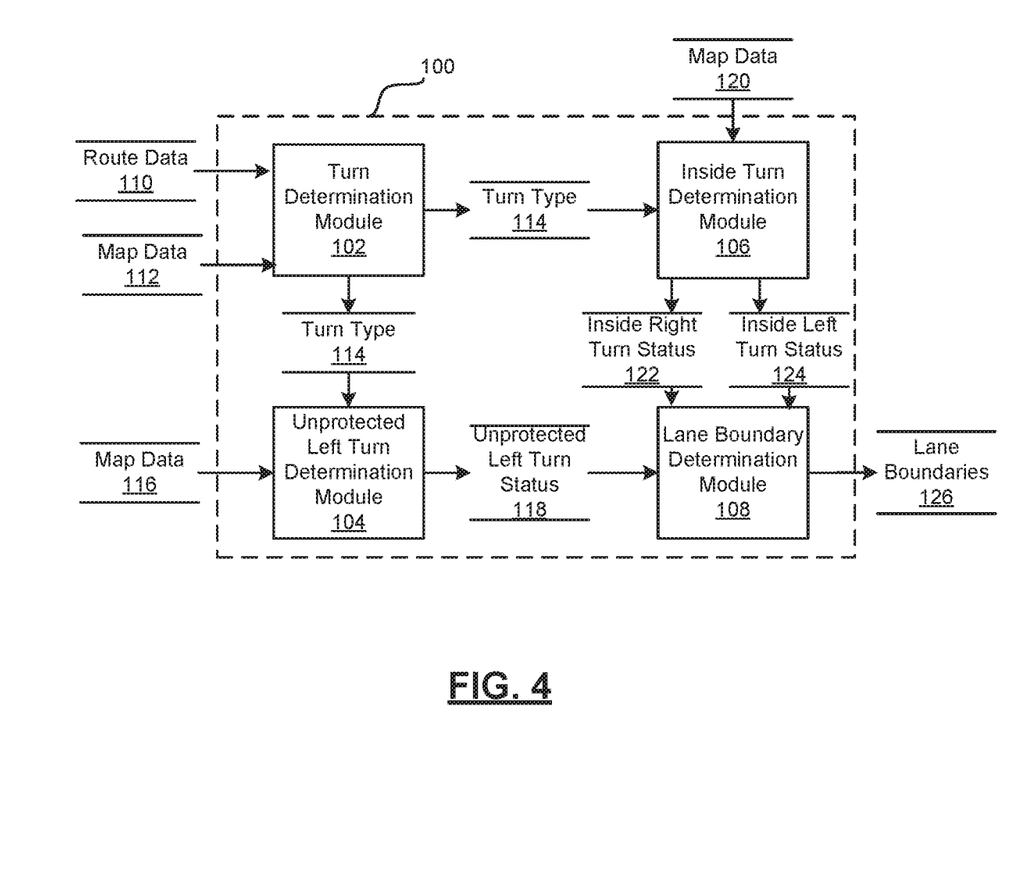

The turn determination module 102 receives as input route data 110 and map data 112. The route data 110 indicates a planned upcoming route of the vehicle 10, including a plan of lanes for travel and can be received from any one of the systems of FIG. 3 as the vehicle is traveling or before the vehicle 10 travels the route. The map data 112 includes map information such as, but not limited to, roads and lane configurations associated with the upcoming route The turn determination module 102 determines if a turn is expected in the upcoming route, and if so, what type of turn 114 is expected. For example, the turn determination module 102 determines that a left turn is upcoming or a right turn is upcoming and sets the turn type 114 based thereon. The turn determination module 102, for example, checks the map data 112 corresponding to a lane of the lane plan to see if the lane is marked as a left turn lane, or a right turn lane and determines that a turn is expected based on the plan of traveling in the marked left turn lane, or the right turn lane.

The unprotected left turn determination module 104 receives the turn type 114 and map data 116. The map data 116 includes map information such as, but not limited to, roads and lane configurations associated with the upcoming route. When the turn type is left turn, the unprotected left turn determination module 104 determines whether the left turn is an unprotected left turn. For example, the unprotected left turn module sets an unprotected left turn status 118 to TRUE when an unprotected left turn is detected and sets the unprotected left turn status to FALSE when an unprotected left turn is not detected.

In various embodiments, the unprotected left turn determination module 104 determines whether the turn is an unprotected left turn based on the map data 116. For example, the unprotected left turn determination module 104 evaluates the map data 116 to see whether the lane is associated with a traffic control device (e.g., a stop sign, a traffic light, etc.). If the lane is not associated with a traffic control device, then the left turn type is an unprotected left turn type. If the lane is associated with a traffic control device and the traffic control device is not a traffic control device having a designated green arrow, then the left turn type is an unprotected left turn type. Unprotected left turns typically happen when turning left from an alley or "minor" road with a stop or yield sign onto a major road; when turning left from a two-way major road with no control device and across traffic; or when turning left at a traffic light and there is no green arrow in the direction of the turn and there is oncoming traffic that has the right of way. The detection of an unprotected turn in this case may be determined from real-time detection of the traffic light type. For example, even though the traffic light has a green arrow, it may not be illuminated; the turn would be deemed unprotected; and if the green arrow is illuminated, the turn is deemed protected.

The inside turn determination module 106 receives the turn type 114 and map data 120. The inside turn determination module 106 determines if the turn is an inside right turn or if the turn is an inside left turn. For example, the inside turn determination module 106 sets an inside right turn status 122 to TRUE when the turn type 114 is right turn and an inside right turn is detected; and sets the inside right turn status 122 to FALSE when the turn type 114 is not a right turn or an inside right turn is not detected. In another example, the inside turn determination module 106 sets an inside left turn status 124 to TRUE when the turn type 114 is left turn and an inside left turn is detected and sets the inside left turn status 124 to FALSE when the turn type 114 is not a left turn or an inside left turn is not detected.

In various embodiments, the inside turn determination module 106 determines that the turn is an inside left turn based on the map data 120, for example, indicating that a predecessor lane (e.g., a lane before the turn lane) has a left boundary that is not shared by another lane as a right boundary; or the predecessor lane is a shared lane. In various embodiments, when the map data 120 indicates that a right turning bike intersection lane associated with the predecessor lane, the inside turn determination module 106 does not determine the turn to be an inside right turn. In various embodiments, a shared lane is a narrow lane where both directions of traffic have the same outside boundaries.

In various embodiments, the inside turn determination module 106 determines that the turn is an inside right turn based on the map data 120, for example, indicating that the predecessor lane has a right boundary that is not shared by another lane as a left boundary; or the predecessor lane is a shared lane. In various embodiments, when the map data 120 indicates that a left turning bike intersection lane associated with the predecessor lane, the inside turn determination module 106 does not determine the turn to be an inside left turn.

The lane boundary determination module 108 receives the inside right turn status 122, the inside left turn status 124, and the unprotected left turn status 118. The lane boundary determination module 108 sets boundary lines (e.g., a left boundary line and/or a right boundary line) to be relaxable (e.g., allowing for travel of the vehicle 10 across the boundary) based on the statuses indicated by the inside right turn status 122, the inside left turn status 124, and the unprotected left turn status 118.

For example, when the inside left turn status 124 indicates TRUE, the lane boundary determination module 108 sets boundary points of a left boundary (a boundary line to the left of vehicle travel) to be relaxable. For example, with particular reference to FIG. 5 where an inside left turn scenario is illustrated, the lane boundary determination module 108 sets all left boundary points of a turn lane 200 to relaxable; sets a determined distance of left boundary points (e.g., five meters or other distance) of the lane 210 before the turn lane 200 as relaxable; and sets a determined distance of left boundary points (e.g., five meters or other distance) of the lane 220 after the turn lane 200 as relaxable.

Figure 5:
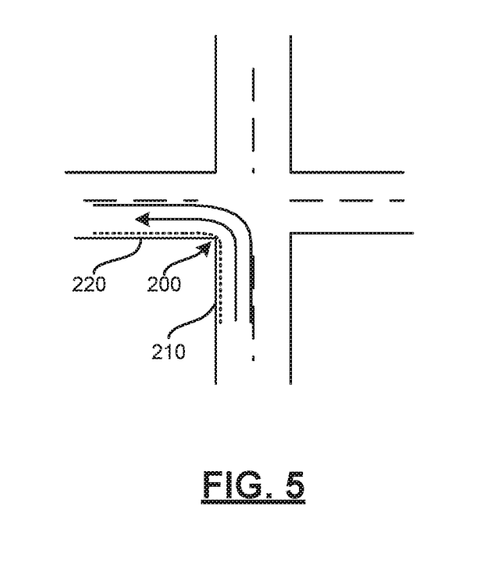
FIGS. 5, 6, and 7 are illustrations of exemplary turning scenarios that are applicable to the boundary determination system, in accordance with various embodiments.

Normally, the AV 10 would not cross certain boundary points. However, at all boundary points that were set as relaxable by the lane boundary determination module 108, the AV 10 is permitted to travel across those points when it otherwise would not.

Figure 6:
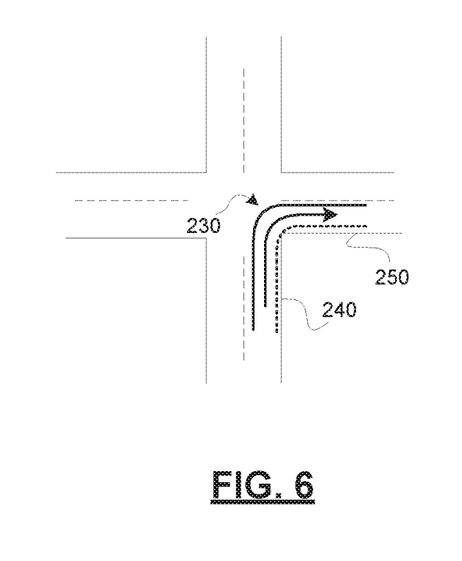

In another example, when the inside right turn status 122 indicates TRUE, the lane boundary determination module 108 sets boundary points of a right boundary to be relaxable. For example, with particular reference to FIG. 6 where an inside right turn scenario is illustrated, the lane boundary determination module 108 sets all right boundary points of the turn lane 230 to relaxable; sets a determined distance of right boundary points (e.g., five meters or other distance) of the lane 240 before the turn lane 230 as relaxable; and sets a determined distance of right boundary points (e.g., five meters or other distance) of the lane 250 after the turn lane 230 as relaxable.

In another example, when the unprotected left turn status is TRUE, the lane boundary determination module 108 sets boundary points of a left boundary to be relaxable. For example, with reference to FIG. 7 where an unprotected left turn scenario is illustrated, the lane boundary determination module 108 determines a creep point 260 as a location in space that specifies how far the vehicle 10 can go along the turn lane before obstructing an oncoming traffic lane. The vehicle stops at this point to wait for oncoming traffic to clear. In various embodiments, the creep point 260 is based on the left turn boundary's first intersection with the oncoming lane's left boundary, for example, the intersection point is projected onto the center line of the oncoming lane.

Figure 7:
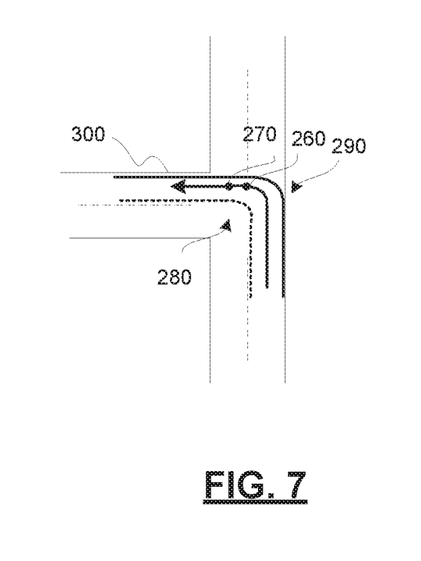

The lane boundary determination module 108 then finds a center point 270 of the first lane 280 after the creep point 260 and determines if the left boundary of this lane is unmarked. If the left boundary of this lane is unmarked, then the boundary points are marked as relaxable. If, however, the left boundary of the lane 280 is marked, for all center points until the end of the turn lane the left boundary points are marked as relaxable; and if the boundary type of the outgoing lane is dashed, then the lane boundary determination module 108 sets a determined distance of left boundary points (e.g., five meters or other distance) of the lane 300 after the turn lane as relaxable.

Figure 8:
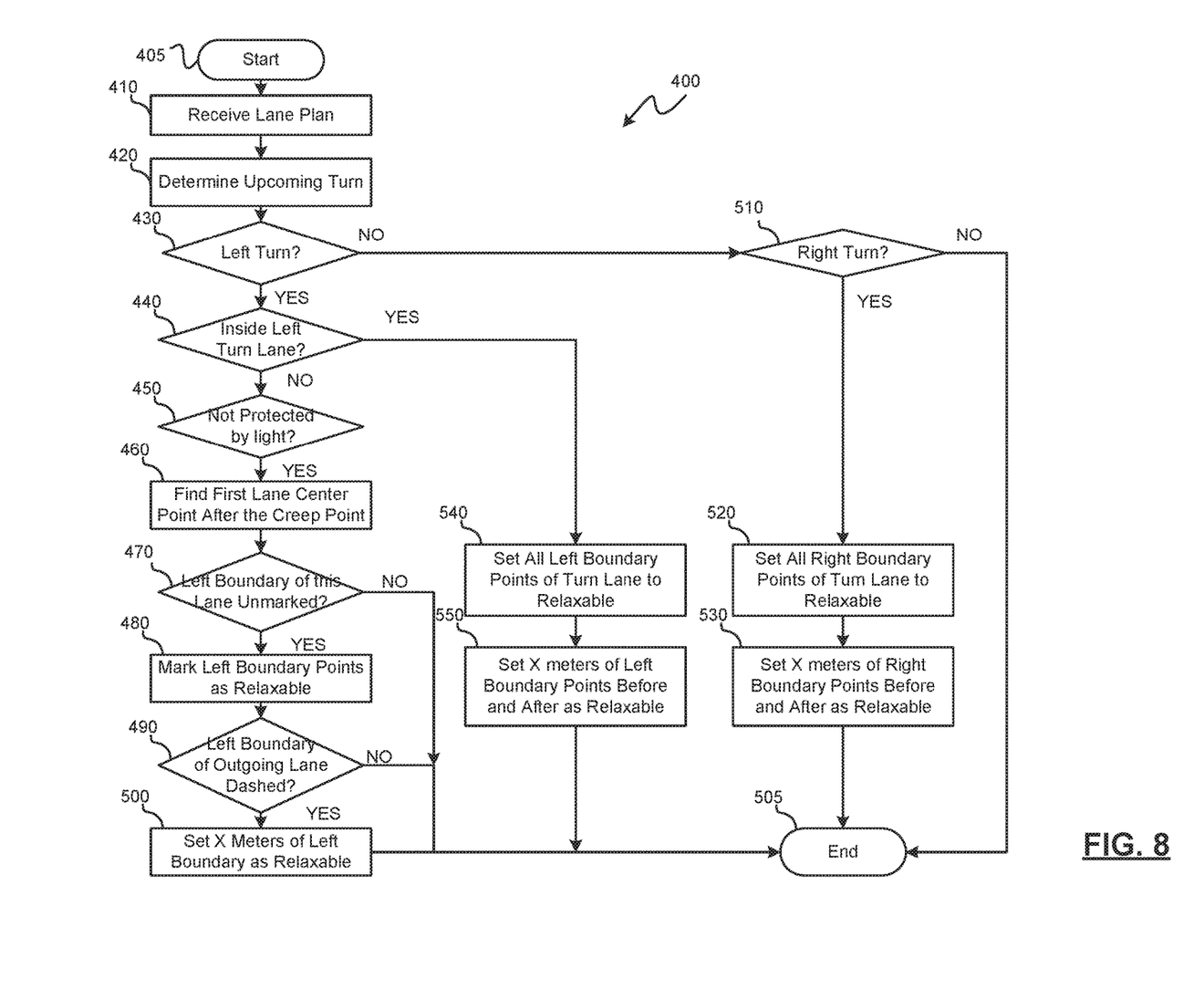
FIG. 8 is a flowchart illustrating a control method for controlling the autonomous vehicle, in accordance with various embodiments.

Referring now to FIG. 8, and with continued reference to FIGS. 1-4, a flowchart illustrates a control method 400 that can be performed by the boundary determination system 100 of FIG. 1 in accordance with the present disclosure. As can be appreciated in light of the disclosure, the order of operation within the method is not limited to the sequential execution as illustrated in FIG. 8, but may be performed in one or more varying orders as applicable and in accordance with the present disclosure. In various embodiments, the method 400 can be scheduled to run based on one or more predetermined events, and/or can run continuously during operation of the autonomous vehicle 10.

In one embodiment, the method may begin at 405. The lane plan of the route is received at 410. The lane plan is evaluated and it is determined that a turn is upcoming at 420. It is then determined at 430 whether the upcoming turn is a left turn at 430. If the upcoming turn is a left turn at 430, it is determined whether the upcoming left turn will be using an inside left turn lane (e.g. as marked in the map data) for example as discussed above at 440. If the turn lane is not an inside left turn lane at 440, it is determined whether the turn lane is not protected by a light (e.g., as indicated by the map data) at 450. If the lane is not protected by a light at 450 (i.e. it is an unprotected left turn), the left boundary is set as a relaxable boundary at 460-480. For example, as previously discussed with regard to FIG. 7, the creep point is determined and a center point of a first lane after the creep point is determined at 460. The left boundary of this lane is selected and evaluated at 470. If the left boundary of this lane is unmarked (with lane boundary lines), the left boundary points of this lane are marked as relaxable at 480. Thereafter, the left boundary of the outgoing lane is evaluated at 490-500. For example, if the left boundary of the outgoing lane is dashed, then a defined distance of the left boundary of the outgoing lane is marked as relaxable at 500. Thereafter, the method may end at 505.

If, at 430, the upcoming lane determined to not be a left turn lane, rather the upcoming lane is determined to be a right turn lane for example as discussed above at 510, right boundary points are set to relaxable at 520-530. For example, as previously discussed with regard to FIG. 6, all boundary points of the right turn lane are set to relaxable at 520; and a defined distance of the right boundary of the lane before the turn and the lane after the turn are marked as relaxable at 530. Thereafter, the method may end at 505.

If, at 430, the upcoming lane is determined to be a left turn lane and is determined to be an inside left turn lane at 440, the left boundary points are set to relaxable at 540-550. For example, as previously discussed with regard to FIG. 5, all boundary points of the left turn lane are set to relaxable at 520; and a defined distance of the left boundary of the lane before the turn and the lane after the turn are marked as relaxable at 530. Thereafter, the method may end at 505.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a vehicle, comprising:
  receiving, by a processor, a lane plan;
  determining, by the processor, from the lane plan an upcoming turn;
  determining, by the processor, if the upcoming turn is at least one of an unprotected left turn, an inside right turn, and an inside left turn;
  when at least one of an unprotected left turn, an inside right turn, and an inside left turn is determined, modifying, by a processor, at least one of a left lane boundary and a right lane boundary of the lane plan to permit crossover by the vehicle; and
  controlling the vehicle based on the modified lane boundary.

2. The method of claim 1, wherein the modifying comprises setting one or more points of at least one of the left lane boundary and the right lane boundary to relaxable.

3. The method of claim 2, wherein the setting one or more points of at least one of the left lane boundary and the right lane boundary comprises setting one or more points of the at least one of the left lane boundary and the right lane boundary of a turn lane associated with the upcoming turn.

4. The method of claim 2, wherein the setting one or more points of at least one of a left lane boundary and a right lane boundary comprises setting one or more points of the at least one of the left lane boundary and the right lane boundary of a predecessor lane associated with the upcoming turn.

5. The method of claim 2, wherein the setting one or more points of at least one of a left lane boundary and a right lane boundary comprises setting one or more points of at least one of a left lane boundary and a right lane boundary of an outgoing lane associated with the upcoming turn.

6. The method of claim 1, wherein the determining, by a processor, if the upcoming turn is at least one of an unprotected left turn, an inside right turn, and an inside left turn is based on map data.

7. The method of claim 6, wherein the determining if the upcoming turn is an unprotected left turn is based on map data indicating whether a traffic device is associated with a lane associated with the upcoming turn.

8. The method of claim 6, wherein the determining if the upcoming turn is an inside left turn is based on map data indicating a predecessor lane has a left boundary that is not shared by another lane as a right boundary.

9. The method of claim 6, wherein the determining if the upcoming turn is an inside right turn is based on map data indicating a predecessor lane has a right boundary that is not shared by another lane as a left boundary.

10. The method of claim 6, wherein the determining if the upcoming turn is at least one of an inside right turn and an inside left turn is based on map data indicating that a predecessor lane is a shared lane.

11. The method of claim 6, wherein the determining if the upcoming turn is at least one of an inside right turn and an inside left turn is based on map data indicating a bike intersecting lane.

12. A system for controlling a vehicle, comprising:
  a first non-transitory module that, by a processor, receives a lane plan and determines from the lane plan an upcoming turn;
  a second non-transitory module that, by a processor, determines if the upcoming turn is at least one of an unprotected left turn, an inside right turn, and an inside left turn;
  a third non-transitory module that, by a processor, when at least one of an unprotected left turn, an inside right turn, and an inside left turn is determined, modifies at least one of a left lane boundary and a right lane boundary of the lane plan to permit crossover by the vehicle; and
  a fourth non-transitory module that, by a processor, controls the vehicle based on the modified lane boundary.

13. The system of claim 12, wherein the third non-transitory module modifies the at least one of the left lane boundary and the right lane boundary by setting one or more points of at least one of the left lane boundary and the right lane boundary to relaxable.

14. The system of claim 13, wherein the third non-transitory module sets one or more points of at least one of the left lane boundary and the right lane boundary of at least one of a turn lane associated with the upcoming turn, a predecessor lane associated with the upcoming turn, and an outgoing lane associated with the upcoming turn.

15. The system of claim 12, wherein the second non-transitory module determines if the upcoming turn is an unprotected left turn based on map data indicating whether a traffic device is associated with a lane associated with the upcoming turn.

16. The system of claim 12, wherein the second non-transitory module determines if the upcoming turn is an inside left turn based on map data indicating a predecessor lane has a left boundary that is not shared by another lane as a right boundary, and determines if the upcoming turn is an inside right turn based on map data indicating a predecessor lane has a right boundary that is not shared by another lane as a left boundary.

17. The system of claim 12, wherein second non-transitory module determines if the upcoming turn is at least one of an inside right turn and an inside left turn is based on map data indicating a bike intersecting lane.

18. An autonomous vehicle, comprising:
a datastore that stores a lane plan; and
a processor configured to determine from the lane plan an upcoming turn, determine if the upcoming turn is at least one of an unprotected left turn, an inside right turn, and an inside left turn, modify at least one of a left lane boundary and a right lane boundary of the lane plan to permit crossover by the vehicle when at least one of an unprotected left turn, an inside right turn, and an inside left turn is determined, and control the vehicle based on the modified lane boundary.

* * * * *